United States Patent [19]

Lenz et al.

[11] Patent Number: 5,319,974
[45] Date of Patent: Jun. 14, 1994

[54] ULTRASONIC LEVEL MEASURING SYSTEM

[75] Inventors: Steven D. Lenz, Lincoln; Raymond Hulinsky, Lincoln, both of Nebr.

[73] Assignee: Isco, Inc., Lincoln, Nebr.

[21] Appl. No.: 114,386

[22] Filed: Aug. 30, 1993

[51] Int. Cl.⁵ .............................................. G01F 23/28
[52] U.S. Cl. ...................... 73/290 V; 367/908; 367/99; 181/124; 364/509; 364/562; 364/581
[58] Field of Search ............ 73/290 V; 367/908, 99, 367/107; 181/124, 402; 364/509, 562, 581

[56] References Cited

U.S. PATENT DOCUMENTS

| | | | |
|---|---|---|---|
| 4,145,914 | 3/1979 | Newman | 73/290 V |
| 4,572,253 | 2/1986 | Farmer et al. | 73/290 V |
| 4,578,997 | 4/1986 | Soltz | 73/290 V |
| 4,700,569 | 10/1987 | Michalski et al. | 73/290 V |
| 4,785,664 | 11/1988 | Reebs | 73/290 V |
| 4,868,797 | 9/1989 | Soltz | 73/290 V |
| 4,992,998 | 2/1991 | Woodward | 73/290 V |
| 5,131,271 | 7/1992 | Haynes et al. | 73/290 V |

FOREIGN PATENT DOCUMENTS 2433133  2/1975  Fed. Rep. of Germany ... 73/290 V
2230608 10/1990  United Kingdom ............ 73/290 V Primary Examiner—Diego F. F. Gutierrez
Attorney, Agent, or Firm—Vincent L. Carney

[57] ABSTRACT

To determine the depth of a body of water, ultrasonic pulses are transmitted from a point above the water at a known distance. Reflections from the water are received and the time of each of the leading edge of the reflections and the trailing edge are recorded as well as the amplitude. This information is used to sort the reflections and the most significant reflections are used to calculate the level of the water. The most significant reflections are determined by multiplying a range of between 10 and 50 times the amount of time difference between the last calculated distance to the target, a factor between 5 and 30 for the time bin that is first, a factor between 10 and 50 multiplied by the number of echoes in the bin divided by the largest number of echoes of all the bins, a value of between 20 and 100 multiplied by the number of correct level echoes in the bin divided by the largest number of correct level echoes of all of the bins and a value of between 5 and 40 multiplied by the average width of the echoes in one bin divided by the widest average of the width of all the bins.

10 Claims, 13 Drawing Sheets

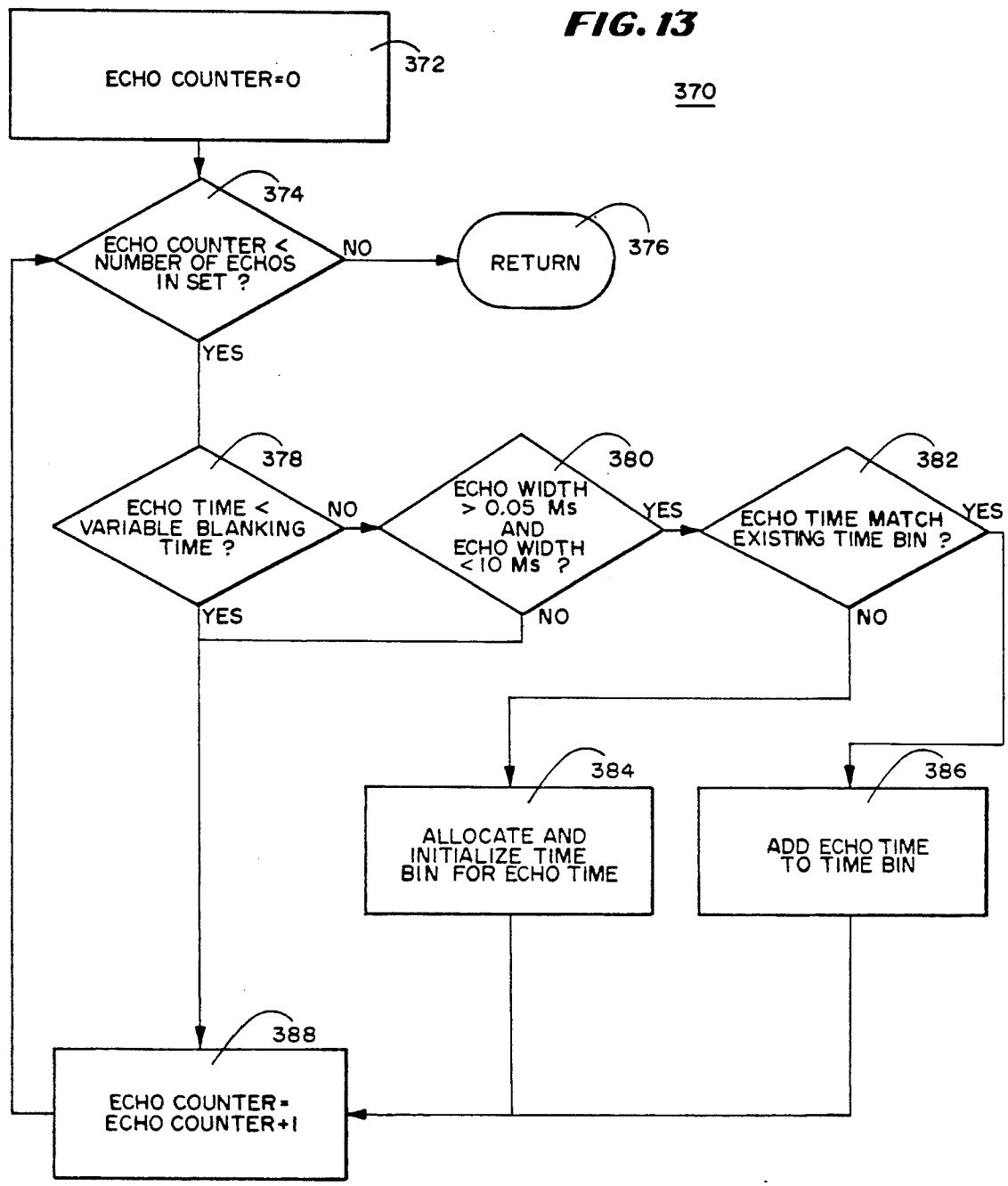

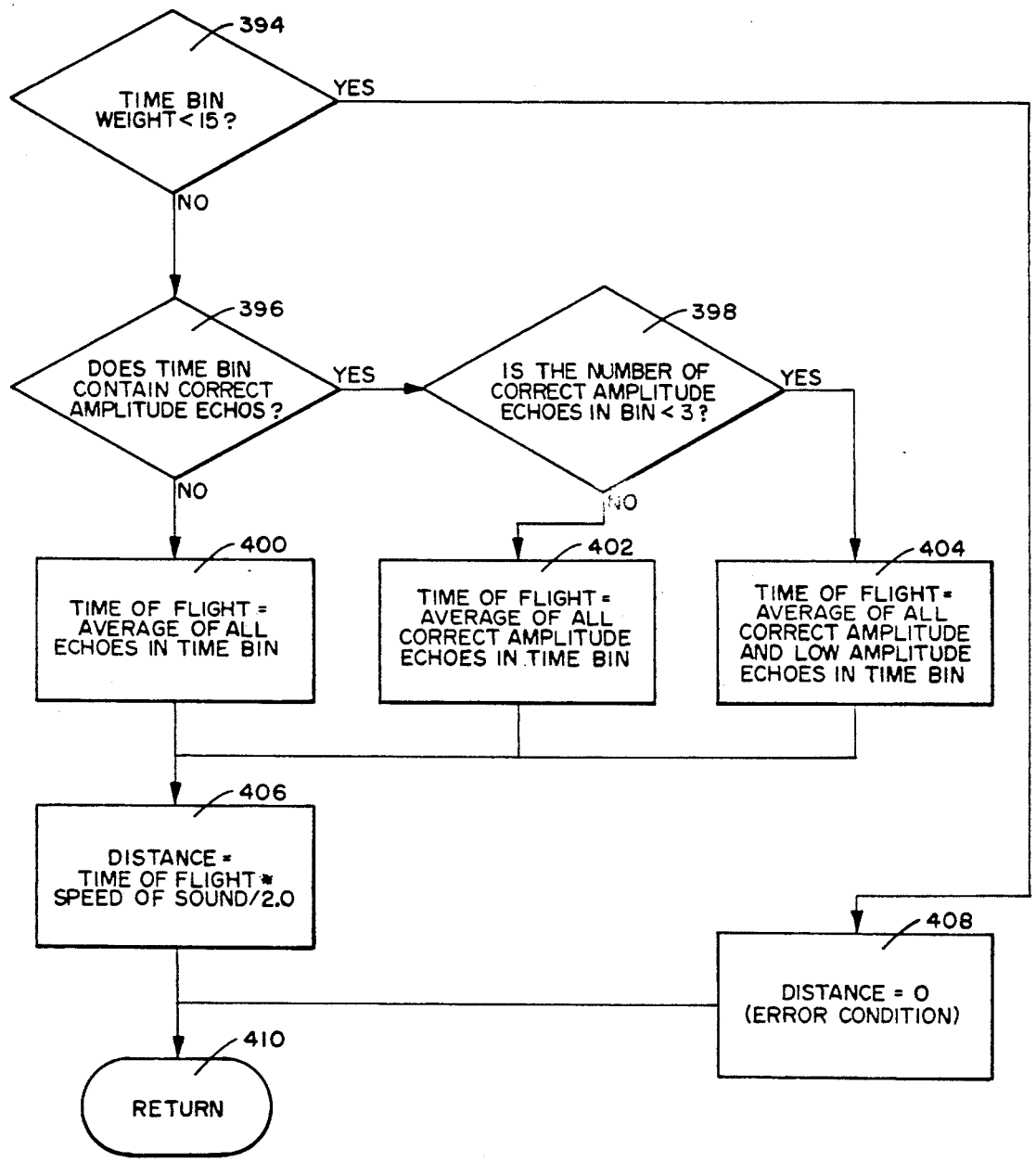

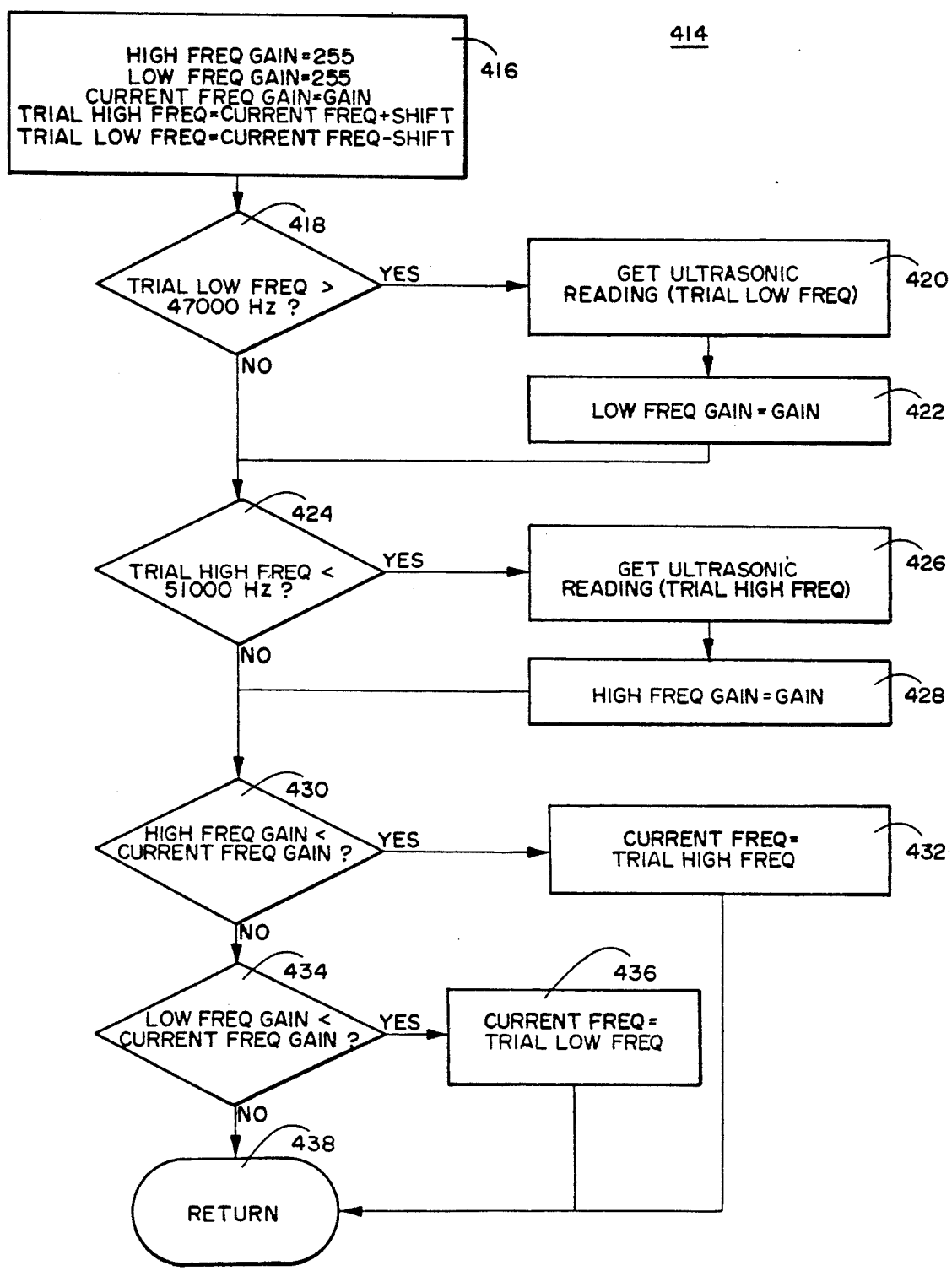

ULTRASONIC LEVEL MEASURING SYSTEM

BACKGROUND OF THE INVENTION

This invention relates to measuring the level or depth of liquids using ultrasonic signals, such as for example, measuring the level of a body of water as part of a flow rate measurement.

It is known to use ultrasonic signals for measuring distances including the distance from a reference point above a body of water to the surface of the body of water. In a known class of such ultrasonic level measuring devices, ultrasonic pulses, each containing sound waves repeated at an ultrasonic frequency, are periodically transmitted and reflections or echoes of the ultrasonic pulses from the water are received. The time between transmitting an ultrasonic pulse and receiving its reflection is used to calculate the distance of the water from which the ultrasonic pulse was reflected. In such systems, the pulses are transmitted and received periodically at a predetermined ultrasonic carrier frequency and the time average of the reflections is used to more precisely determine distance.

In a prior art type of ultrasonic level measuring apparatus of this class, each time a pulse is transmitted, a series of reflections is received and all of the reflections are averaged. The average signal is utilized to determine a peak time of arrival and the peak time of arrival is compared with the time of transmission to determine the distance. This prior art system has the disadvantages of including noise and having a slow response time to changes in level when used as a water level sensing system.

SUMMARY OF THE INVENTION

Accordingly, it is an object of the invention to provide a novel ultrasonic level sensing system.

It is a further object of the invention to provide a novel method for determining distance.

It is a still further object of the invention to provide a more precise technique for using ultrasonic detection to determine distance.

It is a still further object of the invention to provide a technique for discriminating against noise echoes in ultrasonic echo ranging.

In accordance with the above and further objects of the invention, an ultrasonic level sensing system includes a transducer that transmits ultrasonic pulses of a predetermined frequency from a known point toward a surface and receives reflections (echoes). The time after a pulse is transmitted to the reception of the transmitted pulse is recorded.

Time bins (periods of time between two different points in time for which a data record of echo information is recorded or the corresponding portion of the data record that occurs between those two points in time) are established. In the preferred embodiment, these bins are established as reflections are received. In this manner, a plurality of groups of reflections, each from the same transmitted ultrasonic pulse, are compared, one with the other, to aid in determining the distance being measured from the transit time of reflections In this process, a most significant time bin may be decided upon to serve as the basis of the distance calculation.

The choice of the most significant time bin is made based upon several different considerations, such as for example: (1) the closeness of the distance indicated by one bin from the last distance calculated; (2) whether the bin includes the first echo received from the series of echoes; (3) the number of echoes in a bin divided by the largest number of echoes of any of the bins; (4) the number of echoes within a preset amplitude range in a bin divided by the most number of level echoes within the amplitude range in all of the bins; and (5) the average width of the echoes in the group divided by the average width of all of the groups. A time period (hereinafter referred to as a blanking time period) is set from the transmission and any reflections received before the end of the time period are ignored.

The weight given to each of the considerations such as the considerations 1-5 above has been determined empirically. Using numbers corresponding to the numbers of the five considerations listed above, the weight given to each of the five considerations above is respectively: (1) a weight of between 10 and 50 and preferably 30 multiplied by the difference between the last measured distance and the distance represented by the bin divided by the last measured distance; (2) a weight of between 5 and 40; (3) a weight of between 10 and 50 multiplied by the number of echoes in a group divided by the largest number of echoes in all the groups; (4) a weight of between 20 and 100 multiplied by the number of echoes of a sufficient height in a group divided by the largest number of echoes of the predetermined correct level in all of the groups; and (5) a weight of between 5 and 40 multiplied by the average width of the echoes in a group divided by the average width of all of the groups respectively. The sum of these factors may be used to pick the most significant group.

In the preferred embodiment, the transducer is mounted above the flow stream, such as for example above a channel for wastewater. The user normally has an approximate idea of the distance that will be measured. Accordingly, the user can select a minimum distance, such as to the point of overflowing of the channel, and provide a period of time blanking for the particular application so as to not measure echoes which may be only from the sides of the channel or other nearby reflecting surfaces and therefore not be relevant.

The system itself hunts for a frequency that provides the highest amplitude echoes within a selected range of frequencies. The gain is set automatically by the program to seek peaks within the levels. If repeated echoes are below the lower level or above the higher level, then those levels are automatically adjusted so the majority of the peaks falls within the appropriate levels.

To obtain the data for selecting the most significant bin, the leading edge and the trailing edge of each ultrasonic pulse is dated by a microprocessor and its amplitute recorded. This data is then sorted to select the most significant bin as described above.

From the above description, it can be understood that the level measuring apparatus and technique of this invention has several advantages, such as for example: (1) it is less affected by noise; (2) it has a faster response time to raising and lowering of the level of the water; and (3) it is relatively precise.

BRIEF DESCRIPTION OF THE DRAWINGS

The above noted and other features of the invention will be better understood from the following detailed description when considered with reference to the accompanying drawings, in which:

FIG. 13 is a flow diagram of a program for sorting echoes from a data set into time bins;

FIG. 14 is a flow diagram of a program for calculating distance; and

FIG. 15 is a flow diagram of a program for automatically adjusting the transmit frequency.

DETAILED DESCRIPTION

Figure 1:
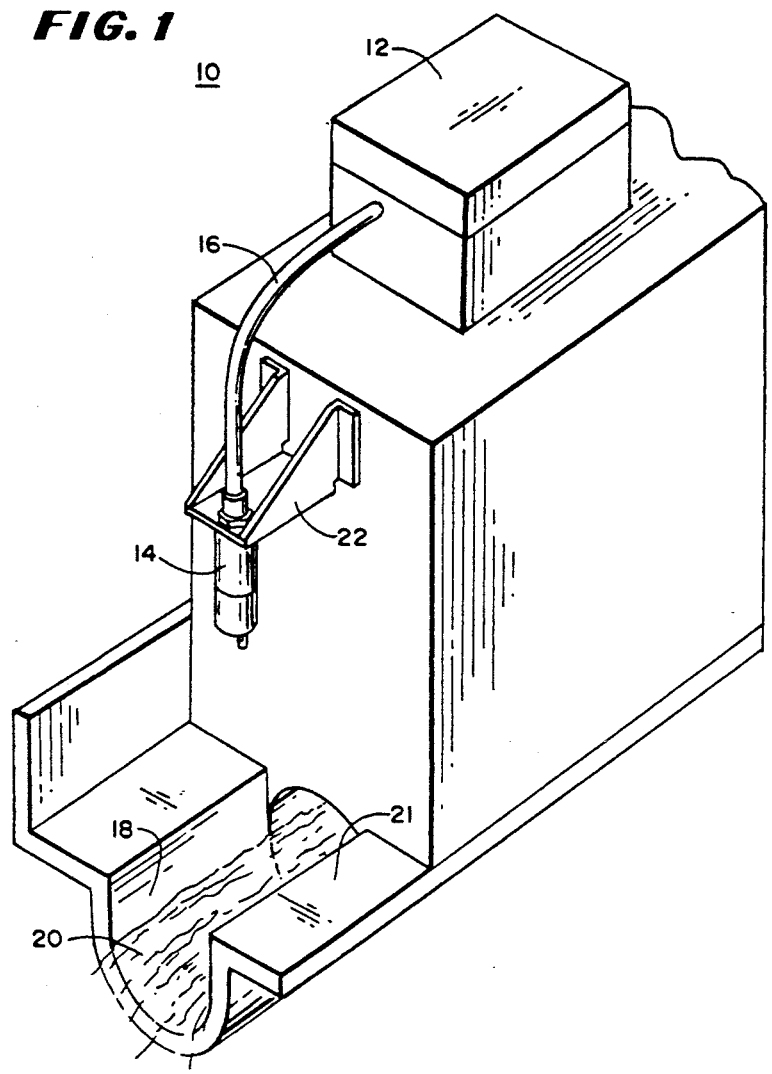
FIG. 1 is a simplified perspective view of a level sensing system mounted in position to measure a flowing stream of water.

In FIG. 1, there is shown a simplified perspective view of a level sensing system 10 mounted over a flow stream 18 to measure the level of liquid 20 as it rises and falls. The level sensing system includes a cabinet 12, a transducer 14 and a cable 16. The cabinet 12 is connected by the cable 16 to the transducer 14 which may be mounted by a bracket 22 directly over the flow stream 18 to transmit ultrasonic pulses of a predetermined frequency downwardly where they are reflected from the water 20 and to receive the reflections. The time between transmission and reception represents twice the distance to the water from the transducer and is used to calculate the level of the water.

In this specification:

(1) "ultrasonic pulse" means a short burst of sound waves at an ultrasonic frequency. The ultrasonic frequency in the preferred embodiment is approximately 49 Khz (kilohertz). The short burst has a time duration in the preferred embodiment of approximately 0.25 ms (milliseconds). Electrical signals at this frequency grouped to form pulses of this duration are applied to a transducer to generate the sound waves. Reflected sound waves are received by the transducer converted to corresponding electrical signals.

(2) "echo receive time" means the time period immediately after transmission of an ultrasonic pulse in which echoes are permitted to be received. This time is dependant upon the maximum distance between the transducer and the desired target (water).

(3) "echo data set" means the set of data received in response to transmission of one ultrasonic pulse. It contains leading and trailing time stamps and amplitude information for all echoes detected within the echo receive time.

(4) "time bin" means a data record that is used to accumulate echo information for echoes that are received within the same range of time between two different points in time. The points in time are measured from the start of a transmitted ultrasonic pulse. In the preferred embodiment, the time bins are established as reflections are received from the transmitted ultrasonic pulse but may be preset time periods instead. The time bin record contains data that is used to determine the weighting of the bin with respect to the others and for calculation of the distance from the target. The words, "time bin" are also from time to time used to mean the time duration during which the reflections within a time bin of the time bin record are received or the time period during which reflections will be considered as being in the same time bin.

(5) "ultrasonic cycle" means the combination of transmission of an ultrasonic pulse, the passage of an echo receive time, the acquiring of echo data set during the echo receive time, and the sorting of an echo data set into time bins. The ultrasonic cycles may overlap in time since some events in it are sound wave events and some are electronic.

(6) "ultrasonic reading" means the sequence of performing multiple ultrasonic cycles and then weighting the time bins. The highest weighted time bin is then used for distance calculation.

In measuring the distance to the water, a blanking time from transmission of an ultrasonic pulse is provided so as to not use echoes from the sides 21 of the flow stream or other reflecting objects that may be closer than the surface of the water in the calculation of the water level. The transducer 14 may be any suitable transducer for transmitting and receiving ultrasound and is not part of the invention except insofar as it cooperates with the level sensing system.

Figure 2:
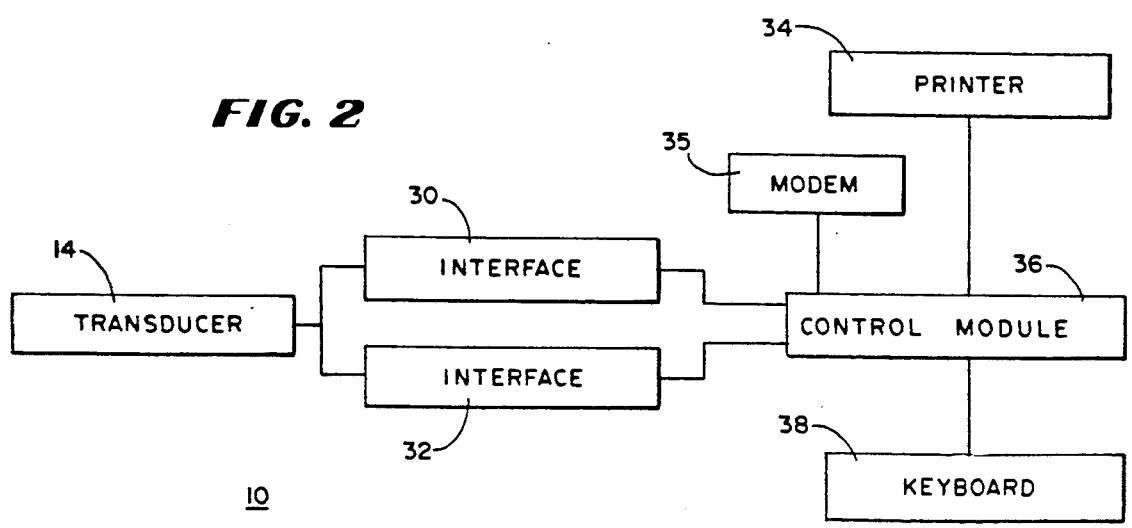
FIG. 2 is a block diagram of the level sensing system of FIG. 1.

In FIG. 2 there is shown a block diagram of the level sensing system 10 having the transducer 14, first and second interfaces 30 and 32, a printer 34, a modem 35 for communicating with remote locations, a control module 36 and a keyboard 38. The transducer 14 both: (1) converts electrical signals into sound waves and transmits them as ultrasonic pulses; and (2) receives ultrasonic pulses as reflections and converts them into corresponding electrical signals. The control module 36 is connected to the transducer 14 through a transmit interface 30 and to a receiver interface 32. The control module 36 is electrically connected to the printer 34 and to the keyboard 38 to receive value and permit a printing of data.

With this arrangement, data may be entered into the control module 36 through the keyboard 38 or by any other suitable input mechanism and data may be received and printed out by the printer 34 or any other output device such as a display or the like indicating the level. It may also be: (1) transmitted to a central location through the modem 35 which may be a radio transmitter or a modem of any type for transmitting data to a remote location; or (2) stored internally for later retrieval.

While many different types of control modules, modems, printers, keyboards or other input devices may be used equally effectively, the control module in the preferred embodiment includes a Hitachi microprocessor, model number 64180, available from Hitachi America, Ltd., Semiconductor and IC Division, 2210 O'-Toole Avenue, San Jose, Calif. U.S.A.

Figure 3:
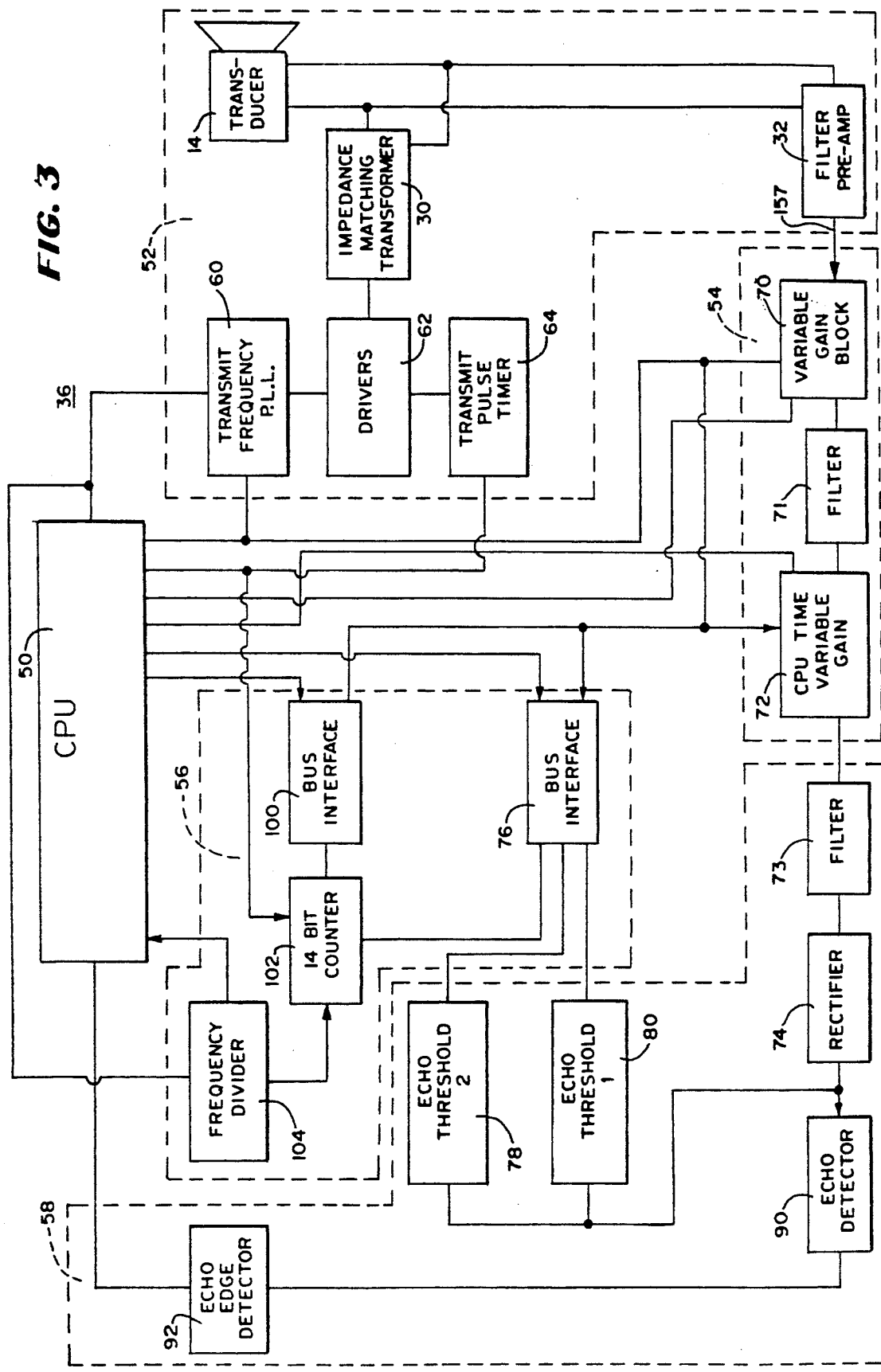
FIG. 3 is a block diagram of the control module in the level sensing system of FIG. 1.

In FIG. 3, there is shown a block diagram of the control module 36 including a microprocessor 50, a transducer section 52, a gain control section 54, a counter section 56 and an echo detector section 58. The transducer section 52 receives signals from the microprocessor 50, transmits ultrasonic pulses periodically in response to the signals from the microprocessor 50 and receives echoes for a time period after each transmission.

In the preferred embodiment, the ultrasonic pulses have a time duration of between 0.5 milliseconds to 2 milliseconds and are transmitted at a carrier frequency in a range of between 40 kilohertz to 65 kilohertz with each pulse being transmitted once every one-tenth of a second in the preferred embodiment. However, the period of the pulse can be set at other values and is generally set to receive all of the echoes from a transmitted pulse before the next pulse is transmitted. The period is set in accordance with the distance between the transmitter and the surface from which it is to be reflected. Generally, it will be in the range of 0.01 seconds to 2 seconds.

The microprocessor 50 receives signals from the echo detector section 58 which receives reflections from the transducer section 52 after adjustment in the gain control section 54. The counter section 56 receives signals from the echo detector section 58 and provides data to the gain control section 54 and to the microprocessor 50 to control the gain and aid in the level measuring function as described hereinafter.

The microprocessor adjusts the gain provided by the variable gain circuit 70 so that the highest amplitude peak falls between two thresholds in voltage amplitude and adjusts the frequency of ultrasound transmitted by the transducer section to provide the transmission at the lowest gain that causes these peaks to fall between the two thresholds.

The echo peaks that do fall between the two thresholds are detected at their leading edge and a time bin is formed with a predetermined amount of time to cause peaks that fall between the time thresholds within the same bin to be counted. In the preferred embodiment, the time bin is 5 counts of the counter which controls the basic operation but can be in a range of between one-half a count of the preferred embodiment to a time frame of ¾ of the time between transmission ultrasonic pulses. The time bin should be no longer in time duration than one-tenth of the entire time required to receive reflections after a pulse is transmitted. In the preferred embodiment, the pulse rate is 384 KHz (kilohertz) and the time bins are approximately 13 microseconds long and in the range of 1.3 microseconds to 75 milliseconds.

The counter section 56 counts time and provides data accordingly to the microprocessor which controls changes in gain in accordance with the program running in the microprocessor. The gain is controlled by the program and the gain control section 54 with respect to the time so as to record the number of peaks within the two thresholds. The echo detector section 58 detects the leading edges and applies a signal to the microprocessor 50 which, in response, retrieves the timing data and controls the gain and the selection of bins.

In the preferred embodiment, the thresholds are set so that a baseline threshold is a voltage just above the noise level typically, 0.25 volts D.C. The voltage between zero voltage and the first threshold typically is equal to 1.7 volts D.C. The second threshold is typically equal to 2.9 volts D.C. However, they may have other values set so they do not cause the peak of the return echo to drop below the first threshold or go above the second threshold. Also the difference between the first and second thresholds should be sufficiently large so that the gain of the adjustable gain amplifier does not need to be adjusted more often than every second. If the difference between the first and second thresholds is made too large, the system will not be able to control the gain accurately enough. This may result in a reading error.

The baseline threshold voltage is used to detect the presence of a return echo. The threshold level should be high enough to not detect amplifier noise and low level noise from the transducer at the highest amplifier gains. The threshold level must be low as possible to detect the return echo as early as possible. A delayed detection of the return echo would result in measurement errors.

The first and second thresholds are used to determine and control the variable gain amplifier setting. The preferred return echo would have a peak amplitude that crosses the first threshold but does not cross the second threshold. The return echo amplitude is a function of the gain of the amplifier and variations in return echo strength due to liquid surface fluctuations and wind between the transducer and liquid surface. The first and second thresholds are set so that the normal fluctuations in return echo amplitude do not result in treating significant echoes as noise.

With this arrangement, the leading edge of the ultrasonic pulses are received and a time bin established. If other ultrasonic pulses are received in response to other transmissions and their leading edges fall within the time bin, they are counted and used as a factor to determine if that time bin is to be the significant time bin that is used to calculate the distance.

The transducer section 52 includes the transmit frequency phase locked loop 60, the drivers 62, the transmit pulse timers 64, an impedance matching transformer 30 and a filter preamplifier 32. The impedance matching transformer 30 is connected in series with transducer 14 and the drivers 62 to provide an impedance matching interface and the filter pre-amplifier 32 is in series with the transducer 14 and the gain control section 54 to provide an interface from the transducer 14 to the gain control section 54. The transducer 14 is electrically connected through the impedance matching transformer 30 and filter preamplifier 32 to receive and transmit ultrasonic pulses of ultrasound to and from the body of water. The reflected signals are transferred through the filter preamplifier 32 which performs filtering and amplification.

The transmit pulse timer 64 receives ultrasonic pulses from the microprocessor 50 at the timed intervals such as one-tenth of a second and applies it to the drivers 62 to cause the ultrasonic pulses to be transmitted. The microprocessor 50 varies the reference frequency in the phase locked loop 60 until the gain provided by variable gain circuit 70 is lowest for echoes within an acceptable amplitude range.

To search for the frequency that requires the least gain, signals to that effect are applied to the microprocessor 50 which selects a frequency and controls the drivers 62 to generate that frequency of ultrasound. The transmit pulse timer 64 is a National Semiconductor MM4538 dual retriggerable monostable multivibrator available from National Semiconductor outlets.

The gain control section 54 includes a microprocessor controlled time variable gain control 72, a filter 71 and a microprocessor controlled variable gain block 70. The variable gain block 70 is controlled to maintain the overall system gain in a range that can be easily processed and to provide amplitude information to the microprocessor. The gain is increased rapidly if the peaks fall below the lower threshold, and if any of the peaks fall above the upper threshold, the gain is slowly reduced. The time variable gain control 72 provides a gain increase with time from the time of pulse transmission to compensate for the attenuation of the later arriving echoes, which echoes are attenuated more by the air because they have travelled a longer distance.

The echo detection section 58 includes an echo edge detector 92, an echo detector 90, a high echo threshold detector 78, a low echo threshold 80, a rectifier 74 and a filter 73. The rectifier 74 rectifies the signal from the transducer section 52 and transmits it to the echo detector 90 which detects signals above a threshold level set above noise signals and transmits the signals above noise to the edge detector 92, the first echo threshold detector 80 and the second echo threshold detector 78.

The echo edge detector 92 includes a pulse shaper and a timer. The pulse shaper produces a series of ultrasonic pulses representing a series of ultrasonic vibrations that are echoes and transmits them to the timer which generates a leading and trailing edge pulse at the beginning and end of the chain of reflections. The time between the leading and trailing edges of the echoes may be stored in memory to provide information about the width of the pulse of the reflected ultrasonic reflections.

The high and low thresholds 78 and 80 are set to detect the amplitude of the received signals. The amplitude is controlled by the microprocessor in cooperation with the time variable gain and variable gain circuits 72 and 70. The thresholds are set so that a baseline threshold is set to be a voltage just above the noise level. This is set in the echo detector circuit 90 which is a trigger circuit.

The settings can be adjusted based upon the signals received at a location so as to receive all of the significant echoes within the range of the variable gain circuits 72 and 70. Accordingly, either the echoes or the thresholds may be adjusted so that the high threshold is increased if the time variable gain cannot increase enough so that echoes arriving a long time after transmission of a pulse from the water, such as is the case with a body of water that is wide and varies greatly in depth with time. Similarly, the lower threshold may be decreased if necessary to receive weak signals under some circumstances. Thus, the threshold circuits may have other values set to detect the peaks in a manner described hereinafter.

In the preferred embodiment, the echo threshold circuits 78 and 80 are type LM2903 comparators and a bus interface 76 is a Motorola or other brand 74HC574 octal 3-state noninverting D flip-flop. If repeated echoes are below the low threshold or above the high threshold, then the gain is adjusted by the microprocessor so the significant peaks fall within the thresholds.

The counter section 56 includes a frequency divider 104, a fourteen-bit counter 102, a first bus interface 76 and a second bus interface 100. The bus interface 76 receives two bits of information from the echo thresholds 78 and 80 indicating if the echoes are above the threshold and/or above the low threshold. The first bus interface 76 gates the highest 6 bits of the 14 bit counter 102 in addition to the two bits from the high and low threshold circuits 78 and 80 to which it is connected to the microprocessor 50 to read. The second bus interface 100 gates the other eight bits of the 14 bit counter 102 to the microprocessor 50. These signals provide timing to determine echo pulse width and the time of the leading edge and trailing edge of each pulse.

In operation, the transmit frequency is set by the transmit frequency phase locked loop 60 and data is stored from the bus interface 100 and bus interface 76. The initial gain of the variable gain amplifier 72 is set and transmitting is started. Each start of transmitting resets the 14-bit counter 102 to keep track of the elapsed time since a transmitted pulse. The dead period (blanking period) is typically 2 to 3 milliseconds but can be adjusted for the environment. In the preferred embodiment, the frequency divider 104 and the 14 bit counter 102 are Motorola 74HC4040 12-stage binary ripple counters and the bus interface 100 is a Motorola 74HC574 octal 3-state noninverting D flip-flop.

Figure 4:
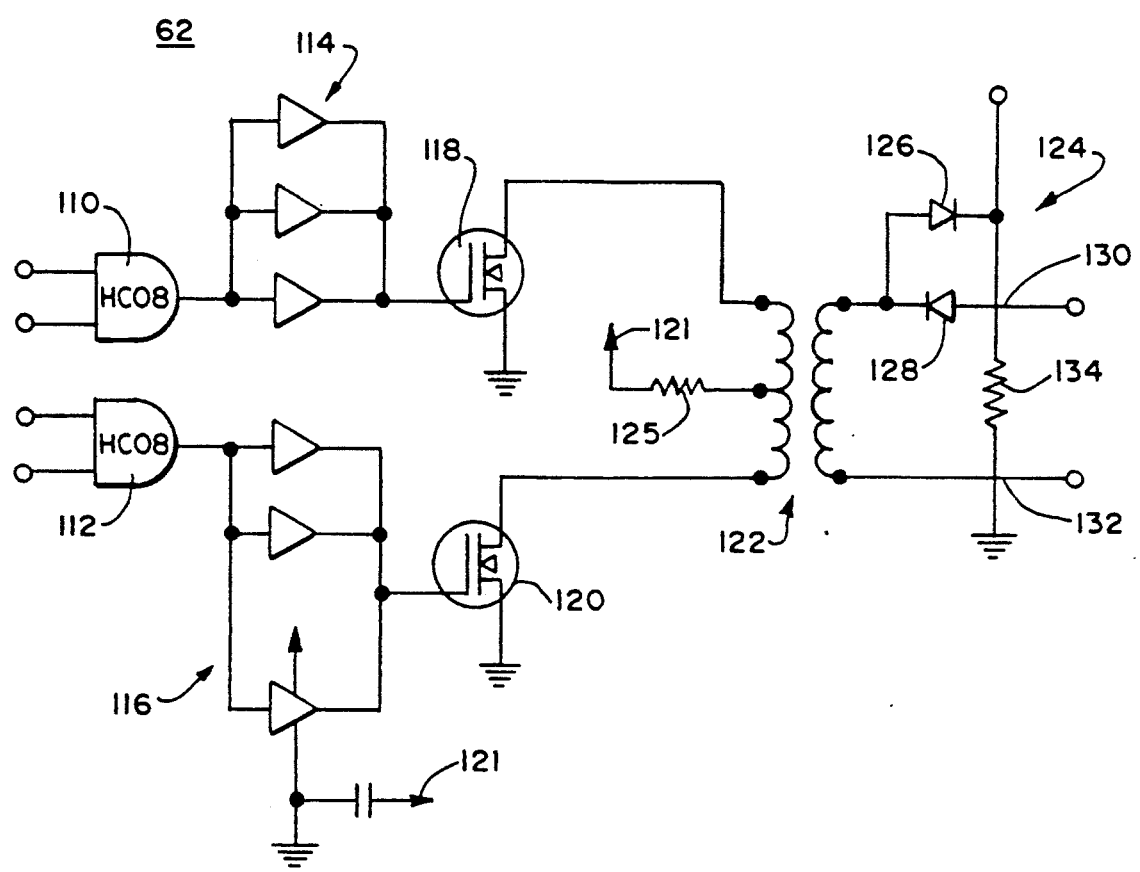
FIG. 4 is a schematic circuit diagram of drivers used in a portion of the block diagram of FIG. 3.

In FIG. 4, there is shown a schematic circuit diagram of the drivers 62 (FIG. 3) having first and second AND gates 110 and 112, first and second banks of amplifiers 114 and 116, each including three amplifiers in parallel to provide adequate driving current, first and second field effect transistors 118 and 120, a transformer 122 and an output circuit 124.

Each of the two AND gates 110 and 112 is electrically connected to a different one of the inputs of the two parallel connected sets of three parallel-connected amplifiers 114 and 116, the outputs of each of the amplifier arrays 114 and 116 being electrically connected through the respective ones of the two field effect transisters 118 and 120 to opposite sides of the center tapped primary winding of the transformer 122. The center tap is electrically connected through a 0.1 ohm resistor 125 to a positive voltage source 121. The secondary of the transformer 122 has one end electrically grounded and the other end electrically connected to the opposite poled diodes 126 and 128, with the opposite sides of the two diodes being electrically connected to output terminal 130. The other end of the transformer secondary 122 is connected to ground and to output terminal 132, with the terminals 130 and 132 being connected together through a 4.7 kiliohm resistor 134.

With this arrangement, transmit frequency signals are gated through the gates 112 and 110 by the transmit pulse timer 64 (FIG. 3) under the control of the microprocessor 50 (FIG. 3) and the frequency of those transmit signals is determined by the phase locked loop 60 (FIG. 3) so that the transformer 122 applies ultrasonic pulses of the selected frequency to the output terminals 130 and 132 through the transformer 122.

Figure 5:
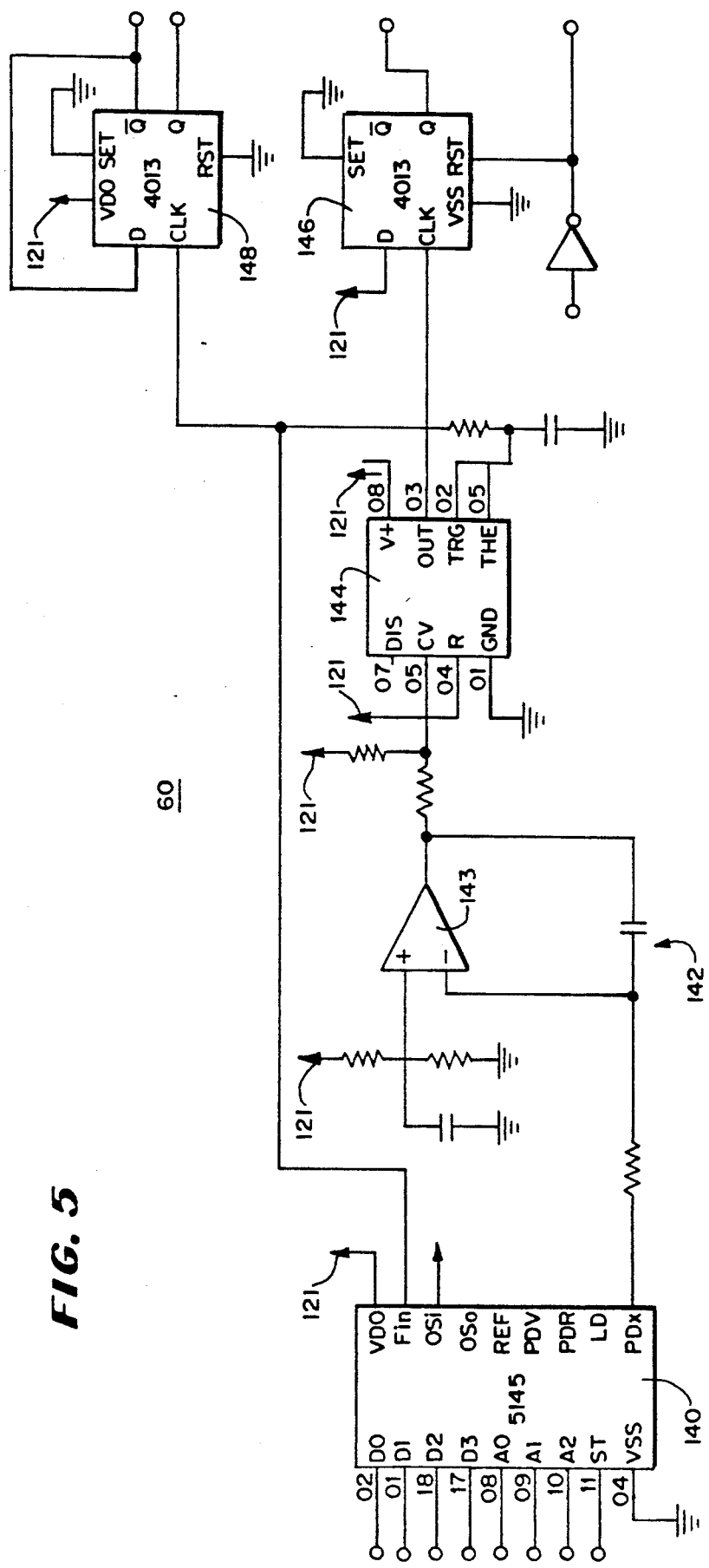
FIG. 5 is a schematic circuit diagram of a frequency control mechanism used in the embodiment of FIG. 3.

In FIG. 5, there is shown a block diagram of the transmit frequency phase locked loop 60 (FIG. 3) including a Motorola MC 145145-1 phase locked loop chip 140 and a frequency generating circuit 142 including a buffer amplifier 143, an Intersil ICM 7555 general purpose oscillator 144 and first and second gates 146 and 148 connected in the sequence named so that frequencies are applied from the timer 144 as set by the microprocessor 50 (FIG. 3).

Figure 6:
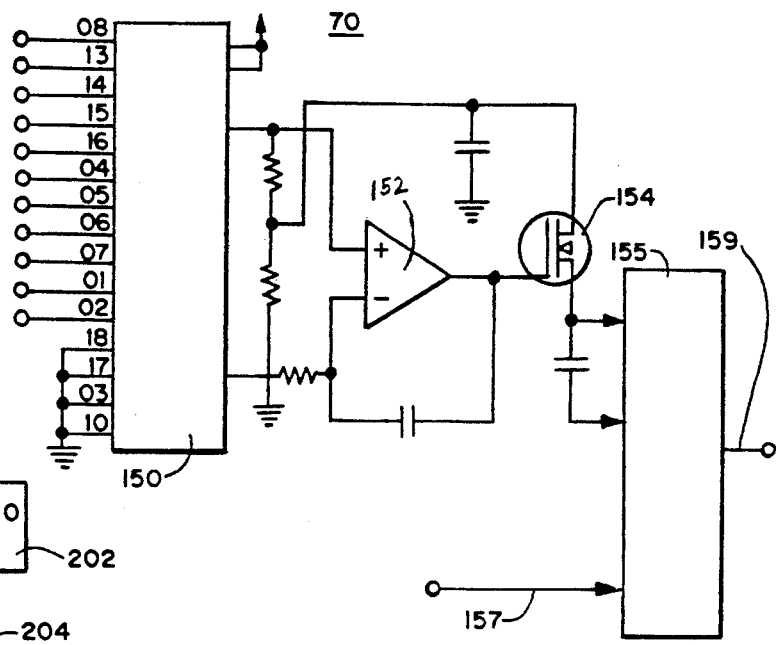
FIG. 6 is a schematic circuit diagram of a portion of the embodiment of FIG. 3.

In FIG. 6, there is shown a schematic circuit diagram of the variable gain amplifier 70, which is identical in structure to the variable gain amplifier 72 (FIG. 3), having a digital-to-analog converter 150, an amplifier 152, a field effect transistor 154 and a current controlled amplifier 155. The digital-to-analog converter 150 is electrically connected to the microprocessor 50 (FIG. 3) from which it receives digital signals indicating gain and through the amplifier 152 and field effect transistor 154 to provide a current control to the current controlled gain amplifier 155. The current controlled gain amplifier 155 receives the echo signals on conductor 157 and in response to the current from the field effect transistor 154, amplifies the echo signals to maintain them in the proper range.

Figure 7:
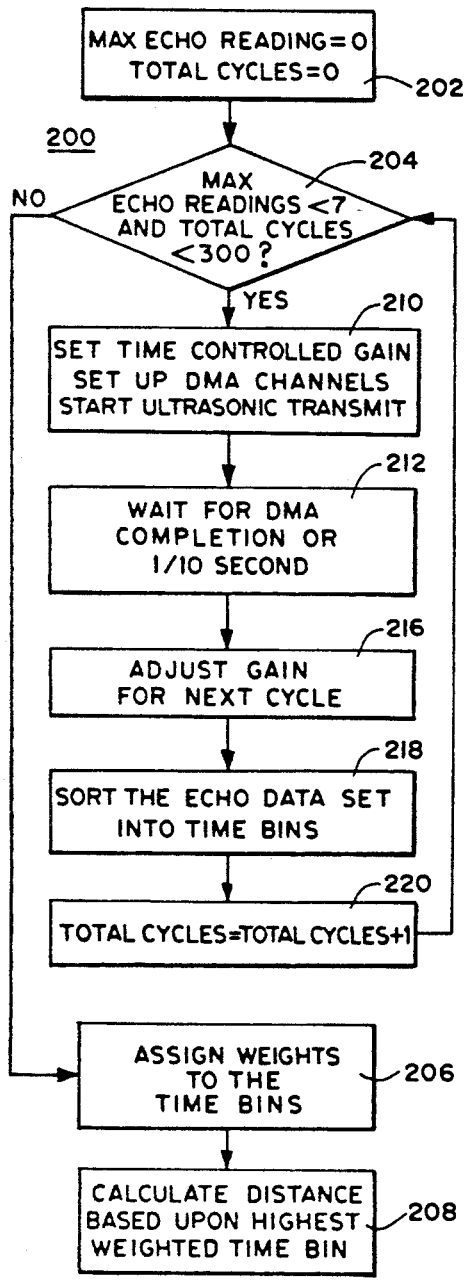
FIG. 7 is a flow diagram of software which may be used in the preferred embodiment.

In FIG. 7, there is shown a flow diagram 200 of the level sensing system 10 (FIG. 1) having the step 202 of initializing the program with a starting condition of no maximum echo readings and no measurement cycles at the start of a program run. MaxEchoReadings in step 202 is the highest number of echoes in any time bin. Total cycles counts the number of ultrasonic cycles that have been performed. From this step, the program proceeds to the decision step 204 that decides if more cycles are to be run resulting in more transmissions of ultrasonic pulses. More cycles are run as long as the total number of echo readings in any time bin are less than 7 and the total cycles are less than 300.

Until there are more than 300 cycles or at least 7 echoes in a time bin, the steps 204-220 for running a cycle are performed, starting from the step 210 of setting the gain and transmitting a pulse to the step 220 for incrementing the register counting the cycles. When the echoes in a time bin are at least equal to 7 or the total loops are at least equal to 300, the program proceeds to the step 206 of weighting the time bins and the step 208 of calculating the distance to the water. The measurements are retrieved by direct memory access channels.(DMA channels) to store the data relating to received reflections, such as the time from transmission to the leading edge and to the trailing edge of each reflection and the amplitude of each reflection.

In this program, the computer counts cycles shown at 220, each cycle starting with a transmission of a pulse and ending with a time period sufficiently long to have received all echoes. Each cycle proceeds through a decision step 204 to decide if: (1) there are fewer than seven reflections in the time bin with the most reflections; and (2) if there have been less than 300 cycles.

If the program indicates there have been less than 300 cycles (300 transmissions of ultrasonic pulses) and less than seven reflections in the same bin, then the program proceeds to follow through another cycle. Otherwise, it proceeds to step 206 to weigh the time bins and to step 208 to determine the distance based on the data from the highest weighted time bin. The most reliable time of transit multiplied by the speed of the sound indicates twice the distance.

If another cycle is to be performed, then decision block 204 proceeds through step 210 to set the time controlled gain and start an ultrasonic transmit pulse. From there, the program proceeds to step 212 which waits for the completion of the transmit and the time allotted for the reception of signals, which is one-tenth of a second.

At that point in time, the transmit pulse timer stops at step 214 and the program proceeds to step 216 to adjust the gain for the next cycle. The gain is adjusted to maintain echo peaks within the first and second thresholds in amplitude. After that, the echo data is sorted into time bins as shown in step 218 and the total cycles counted as shown in step 220 which proceeds back to the decision block 204 to determine if there are fewer than seven reflections in the time bin with the most reflections or 300 cycles.

Figure 8:
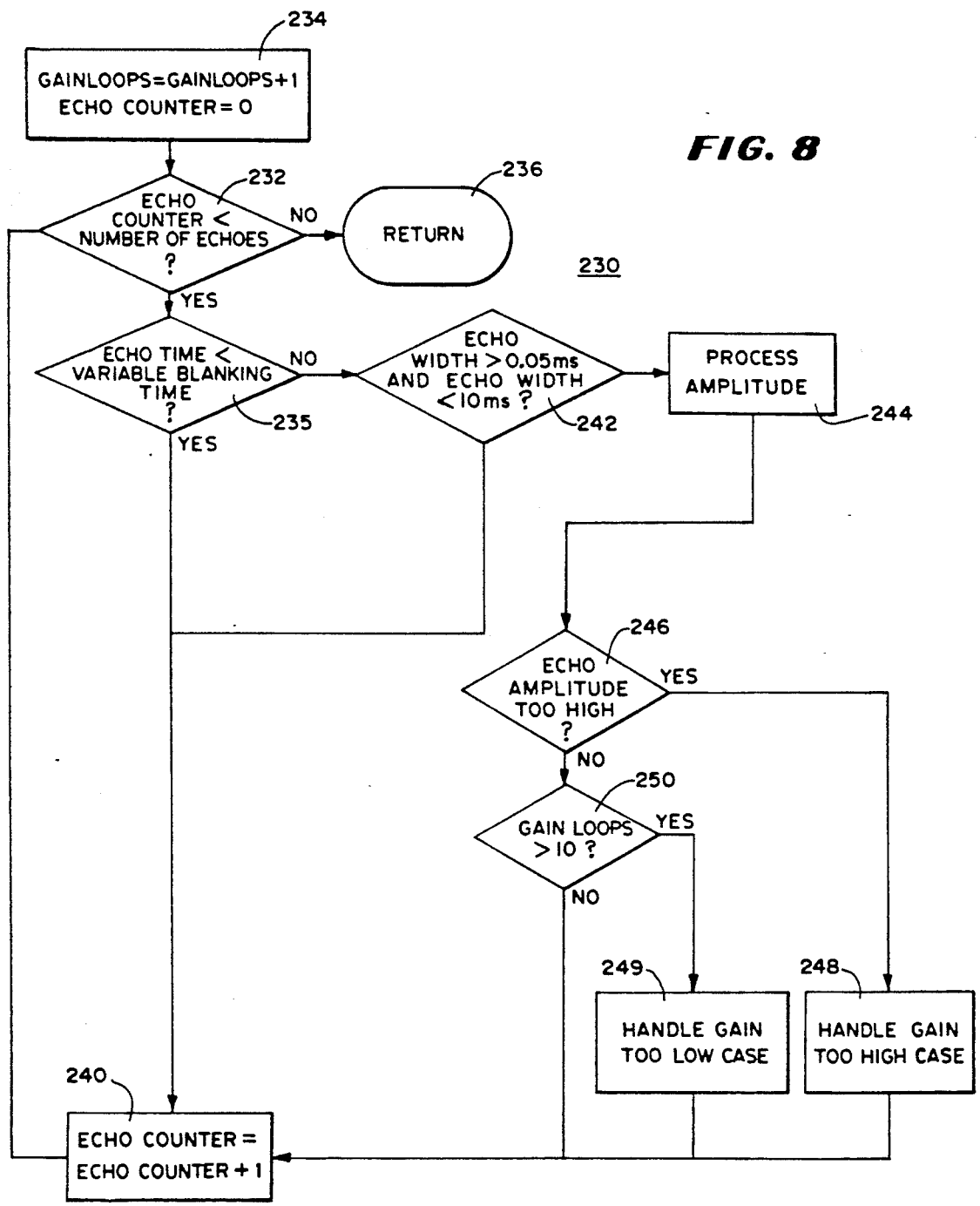
FIG. 8 is a flow diagram of the software which may be used in the preferred embodiment of the invention.

In FIG. 8, there is shown a flow diagram 230 of the program for adjusting the gain for the next cycle comprising initialization shown at step 234 in which step GainLoops is a software counter that is use to implement a delay before increasing the gain. In step 232, echo counter is a counter used as an index into echoes of an echo data set. The program starts with the decision step 232 of checking the echo counter. If the count is less than the number of echoes in this data set, then the program proceeds to the decision step 235, otherwise, it proceeds to a return step 236.

If the echo counter contains a number lower than the number of echoes, then the step 235 determines if the echo time is less than the variable blanking time. If it is, then the program proceeds to step 240. The step 240 increments the echo counter and returns to step 232 so as to disregard echoes that are received during the variable blanking period. If it is not, then the echo width is checked at the decision step 242 to determine if its width is greater than 5/100's of a millisecond and less than 10 milliseconds. If it is not, the echo is considered as noise and disregarded and the program proceeds to step 240 to increment the echo counter and return. If it is not, then the program processes the amplitude as shown at step 244 and proceeds to decision step 246 which determines if the echo amplitude is too high or not.

If the reflection is too high in amplitude, then the program proceeds to step 248 to quickly decrease the gain, but if it is too low, it proceeds to decision step 250 which counts loops to increase the gain once every ten loops. In each loop up to ten loops the program proceeds to step 240 and after the counter is incremented, it returns to decision step 232. Otherwise, the program proceeds directly to step 249 to increase the gain and from there to step 240. When the echo counter equals the echo count for the echo set, the program returns.

Figure 9:
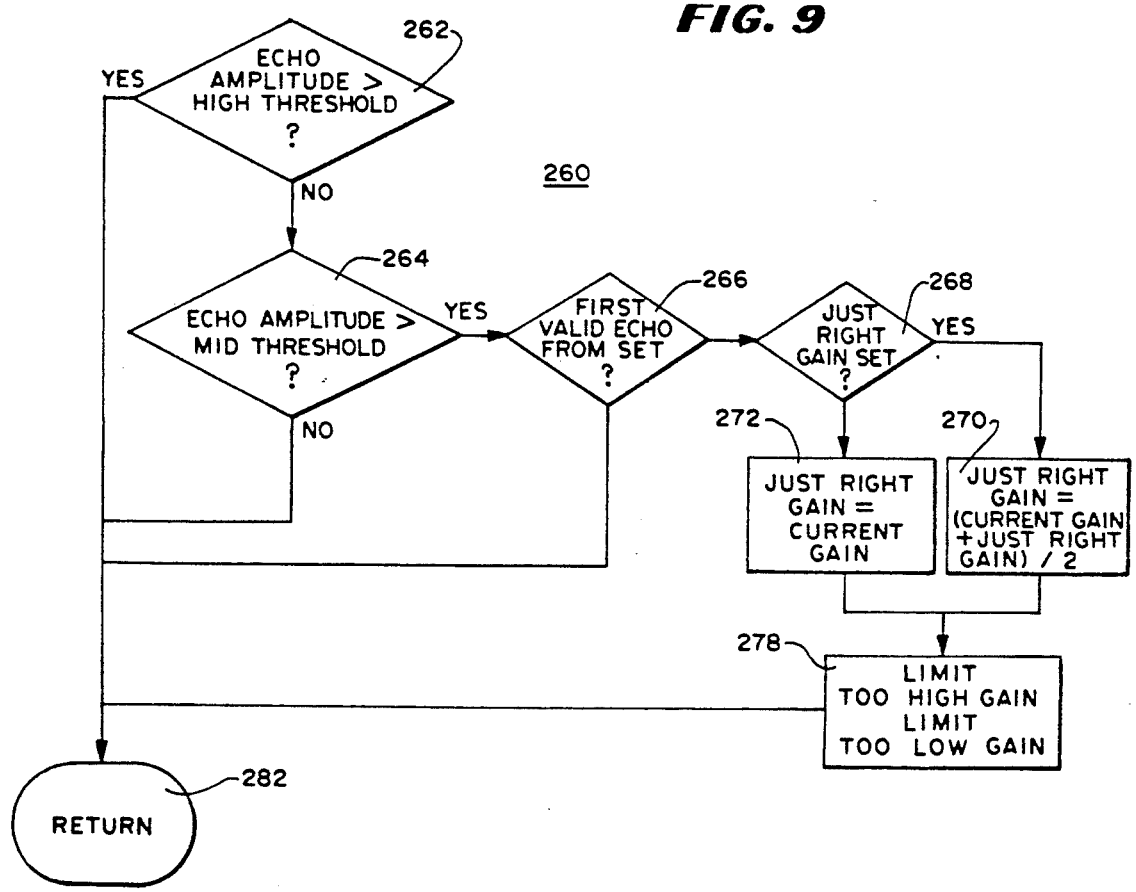
FIG. 9 is a flow diagram illustrating the program for adjusting the gain.

In FIG. 9, there is shown a flow diagram 260 of the program for processing echo amplitudes in preparation for adjusting the gain up or down as generally indicated at steps 248 and 249 (FIG. 8) within the variable gain circuit 70 (FIG. 3). As shown in this flow diagram, if the echo amplitude is greater than the highest threshold as decided in decision block 262, the program proceeds to the return step 282. If it is not, then the program proceeds from step 262 to decision step 264 which determines if the echo amplitude is greater than a mid amplitude threshold.

If the amplitude is not greater than the mid amplitude threshold as shown at step 264, the program proceeds to the return step 282. If the amplitude is above the mid threshold and below the high threshold, then decision step 264 proceeds to decision step 266 which determines if it is the first valid echo from the set. If not, the program returns as shown at step 282.

If it is the first valid echo, then decision step 266 proceeds to step 268 to determine if the gain value that has produced correct amplitude echoes has already been set. If not, the program proceeds to step 272 to save the current gain value that has produced the correct amplitude echo into just right gain. From there it proceeds to step 278, which limits the too high gain and limits the too low gain numbers based on the new value of the just right gain. If the just right gain is set as shown at 268 then the program proceeds to calculate a new just right gain by averaging the current gain and the just right gain and proceeding to step 228 to limit the high/low gains and then returning at step 282.

Figure 10:
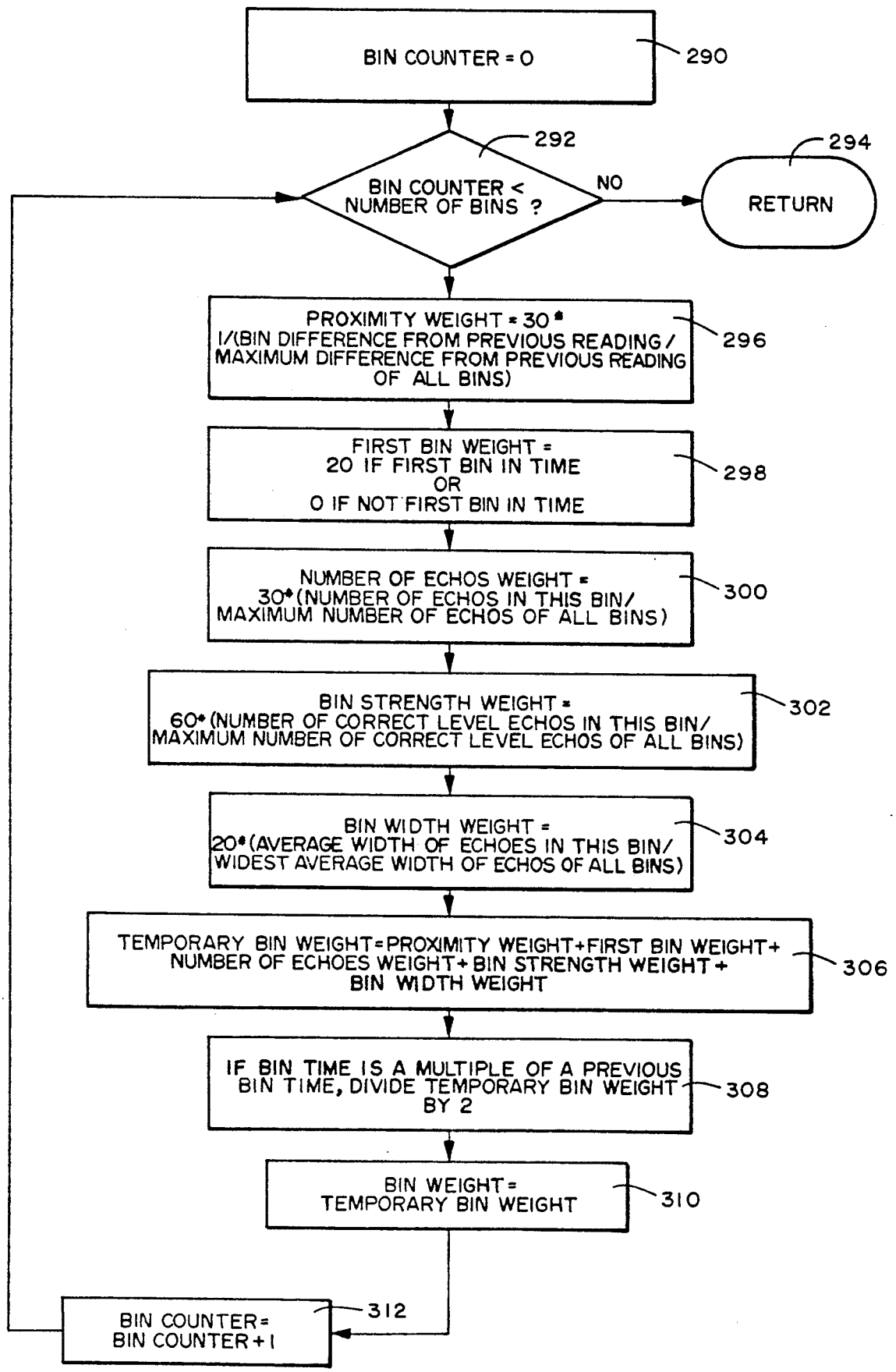
FIG. 10 is a flow diagram illustrating the program for assigning weight to reflections of ultrasound.

In FIG. 10, there is shown a flow diagram 288 of the program for assigning weights to the time bins including the step 290 of setting the bin counter to zero, followed by the decision step 292 of determining if the counter is greater than the number of bins or lower. If it is greater then the program proceeds to the return step 294 for another section loop. If it is lower, then it proceeds to the proximity assigning step 296 and calculates the bin proximity weight of 30 times one divided by the time bin difference from the previous reading divided by the maximum difference from the previous reading of all the time bins.

Next, the program proceeds to step 298 at which a first bin weight of 20 is assigned if it is the first bin in time or zero if its not the first bin in time. This is followed by the step 300 of assigning a weight representing the number of echoes weight which is equal to 30 multiplied by the dividend of the number of echoes in the bin divided by the maximum number of echoes in all of the bins.

Step 300 is followed by step 302 which assigns a bin strength weight of 60 multiplied by the dividend of the number of correct level echoes in the bin divided by the maximum number of correct level echoes in all of the bins, followed by the step 304 of assigning a bin width weight equal to 20 multiplied by the dividend of the average width of echoes in the bin divided by the widest average width of echoes in all of the bins followed by the step 306 of assigning a temporary bin weight equal to the proximity weight plus the first bin weight plus the number of echoes weight plus the bin strength weight plus the bin width weight and followed by the step 308 of determining if the time bin is a multiple of a previous time bin and dividing the temporary bin weight by two if it is. This is followed by the step 310 of indicating that the group weight is equal to the temporary group weight. This is followed by step 312 of incrementing the loop to the next time bin.

Figure 11:
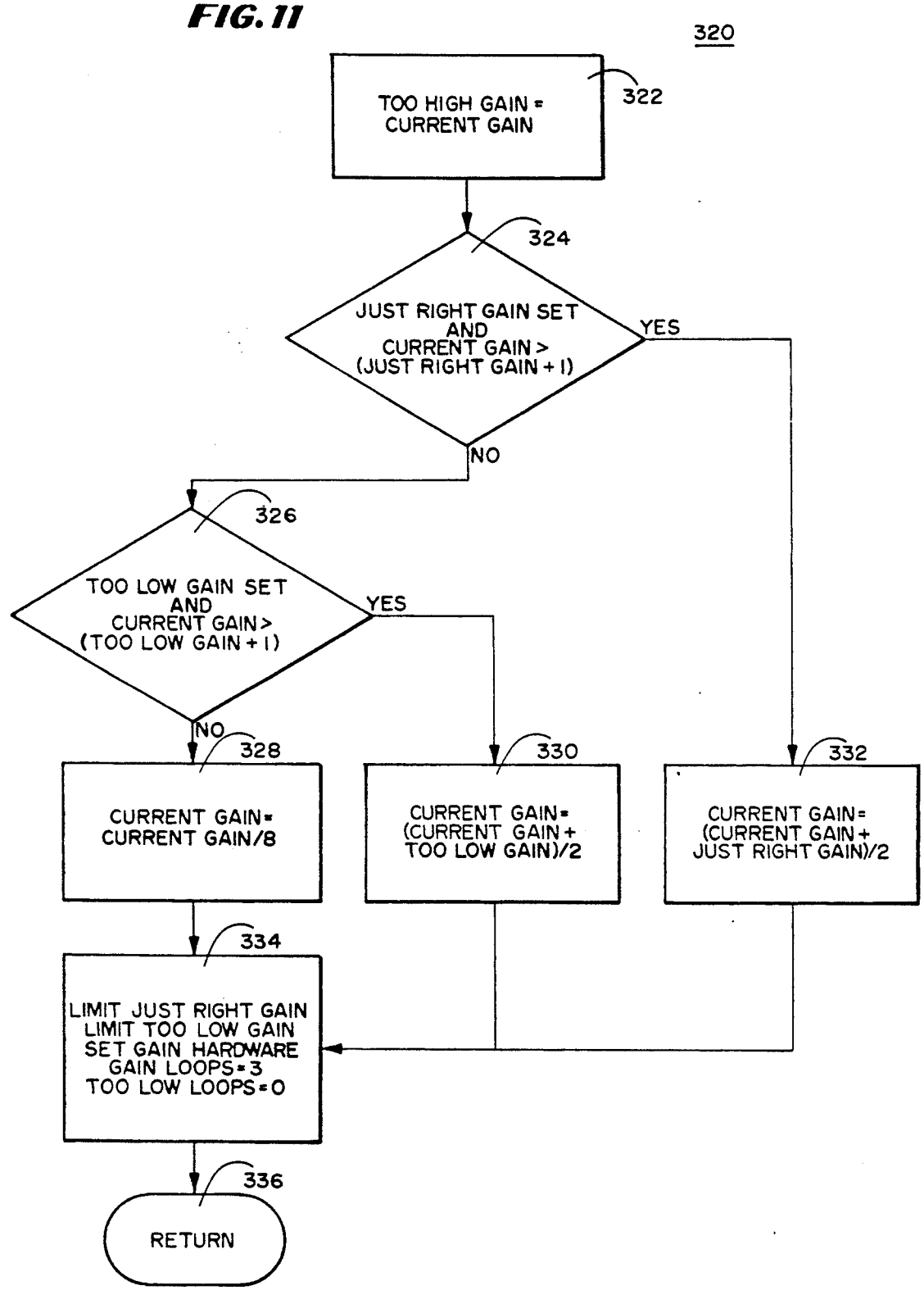
FIG. 11 is a flow diagram showing in greater detail one step of the flow diagram of FIG. 8.

In FIG. 11, there is shown a flow diagram 320 which is a more detailed diagram of step 248 in FIG. 8 which calculates a new gain value to reduce the signal strength. In this flow diagram TooHighGain is a gain value that produces high amplitude return echoes. TooLowGain is a gain value that produces too low amplitude return echoes. JustRightGain is a gain value that produces echoes with the desired amplitude. CurrentGain is the current gain setting.

Starting with step 322, the current gain value is copied into the TooHighGain variable to record a gain value that produces too high amplitude return echoes. Proceeding to the decision step 324, which checks whether there is a recorded gain value (JustRightGain) that has previously produced appropriate level echo amplitudes. If there is and the CurrentGain is greater than it plus 1, then flow proceeds to step 332 where a new CurrentGain is calculated to be the average of the JustRightGain and the CurrentGain and then proceeds to step 334. If there is no JustRightGain in the decision step 324 or the CurrentGain is less than or equal to the JustRightGain plus 1, then flow proceeds to the decision step 326.

At step 326, a decision is made whether there is a recorded gain value (TooLowGain) that has previously produced echo amplitudes that were too low. If there is and the CurrentGain is greater than it plus 1, then flow proceeds to step 330 where a new CurrentGain is calculated to be the average of the CurrentGain and the TooLowGain and then proceeds to step 334. If there is no TooLowGain in the decision step 326 or the CurrentGain is less than or equal to the TooLowGain plus 1, then flow proceeds to step 328 where a new CurrentGain is calculated to be CurrentGain divided by 8 then proceeds to step 324.

Step 334 limits the JustRightGain and TooLowGain values based upon the new CurrentGain value, transfers the CurrentGain value to the hardware and sets TooLowLoops to zero. Flow then proceeds to the return step 336.

Figure 12:
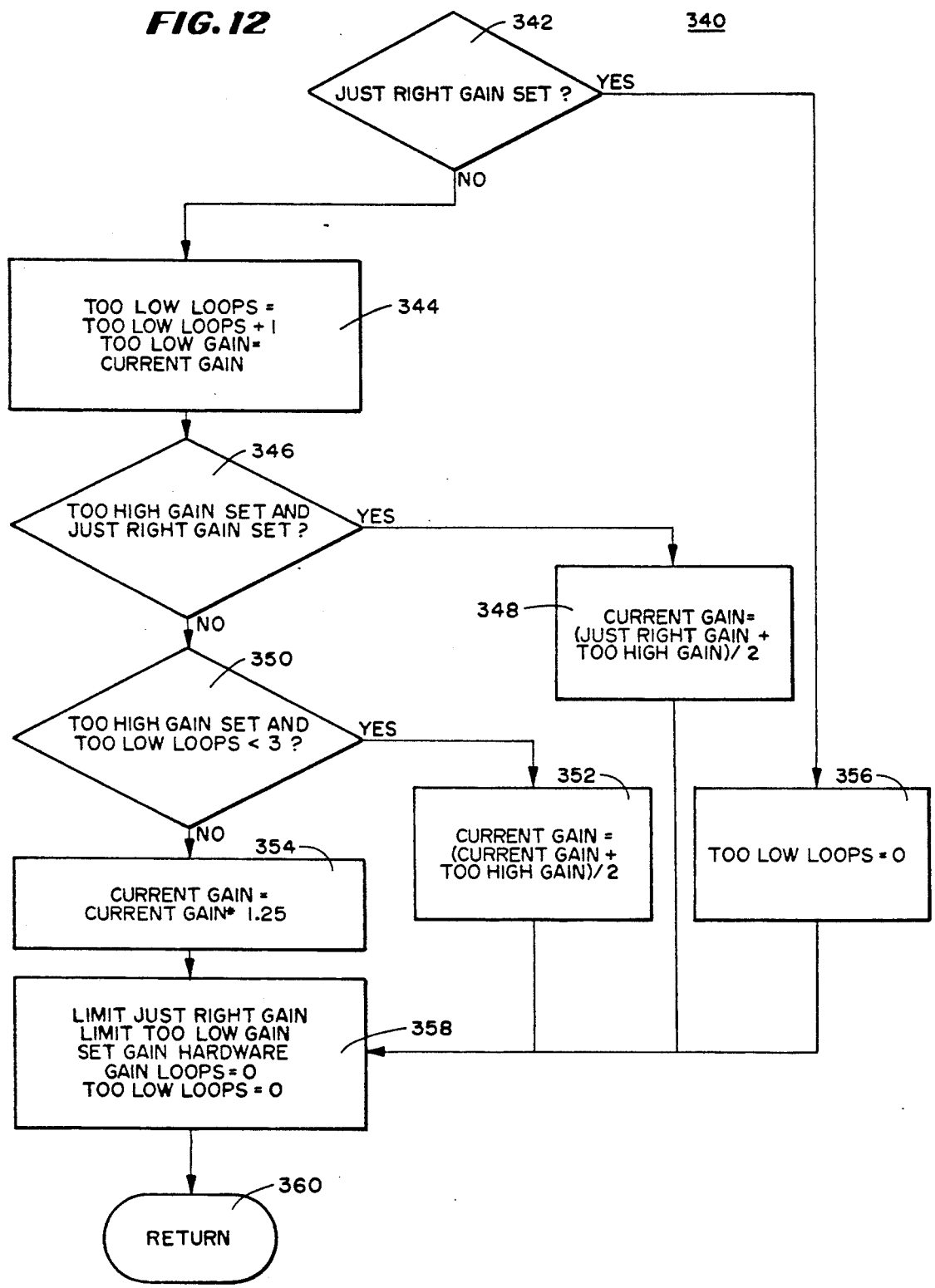
FIG. 12 is a flow diagram showing one step of the flow diagram of FIG. 8 in greater detail.

In FIG. 12, there is shown a flow diagram 340 which is a more detailed diagram of step 249, FIG. 8, which calculates a new gain value to increase the signal strength. In this diagram TooHighGain is a gain value that produces too high amplitude return echoes. TooLowGain is a gain value that produces too low amplitude return echoes. JustRightGain is a gain value that produces echoes with the desired amplitude. CurrentGain is the current gain setting. Starting with decision step 342, which checks whether there is a recorded gain value (JustRightGain) that has previously produced appropriate level echo amplitudes. If there is then flow proceeds to step 358, if not, then flow proceeds to step 344 where the count of ultrasonic cycles (TooLowLoops) that have produced too low of amplitude echoes is incremented and the current gain value is copied into the TooLowGain variable to record a gain value that produces too low amplitude return echoes.

The next step is decision step 346, which checks whether there is a recorded gain value (TooHighGain) that has previously produced too high amplitude return echoes and a recorded gain value (JustRightGain) that has previously produced appropriate level echo amplitudes. If there is, then flow proceeds to step 348 where a new CurrentGain is calculated to be the average of the JustRightGain and the TooHighGain and then proceeds to step 358. If either JustRightGain or TooHighGain is not set, then flow proceeds to decision step 350.

Step 350 determines if the TooHighGain is set and three ultrasonic cycles have occurred without an appropriate amplitude echo received (TooLowLoops<3). If the decision is true, a new CurrentGain is calculated to be the average of the CurrentGain and the TooHighGain and then proceeds to step 358, otherwise flow proceeds to step 354 where the current gain is multiplied by a 1.25 factor. Execution then continues with step 358.

Step 358 limits the JustRightGain and TooLowGain values based upon the new CurrentGain value, transfers the CurrentGain value to the hardware and sets TooLowLoops to zero. Flow then proceeds to the return step 360.

In FIG. 13, there is shown a flow diagram 370 of the program for sorting echoes from a data set into time bins. The initialization step 372 is performed to initialize the counter used to index through the echo data. Steps 374 and 388 combine to create a loop to process all the echoes in the data set. When all echoes have been processed, flow proceeds to the return step 376. Processing of an individual echo is accomplished starting with decision step 378 which checks the time of the echo with the variable blanking time. If it is less (it should be ignored), it does not process the echo by proceeding to step 388. If it is greater than or equal to the variable blanking time, flow continues with decision step 380.

Step 380 checks for echo widths greater than 5/100 of a millisecond to 10 milliseconds, if it is out of the range (it should be ignored), it does not process the echo by proceeding to step 388. If the echo width is in range, flow continues with step 382 which searches for an existing time bin the echo time will fit into. If a time bin is found that matches the echo time flow proceeds to step 386 and the echo data is added to the time bin information and then continues with step 388 to process the next echo. If a time bin is not found that matches the echo time, flow proceeds to step 384 to allocate a new time bin and initialize it with the current echo data. Execution then proceeds with step 388 to process the next echo.

In FIG. 14, there is shown a flow diagram 392 of the program for calculating the distance based upon the highest weighted time bin. The decision step 394 compares the bin weight to 15. If the bin weight is less than 15 the true condition is taken and flow proceeds to step 408 where the distance is set to 0, which is an error condition, and then proceeds to the return step 410.

If the bin weight is greater than or equal to 15, flow continues with step 396. Step 396 determines whether the bin contains echoes of the desired amplitude, and if so, continues with step 398, otherwise it proceeds to step 400, which calculates the Time of flight based upon all the echoes in the time bin, and then continues with step 406.

Step 398 determines if the bin has three or more correct amplitude echoes. If it does, then execution proceeds to step 402 where the time of flight is calculated to be the average of all the correct amplitude echoes and continues to program step 406. If a bin does not have 3 or more correct amplitude echoes, execution proceeds to step 404, where the time of flight is calculated to be the average of all the correct and low amplitude echoes, and continues to step 406. Step 406 calculates the distance based upon the time of flight of the returned echo and the speed of sound. Execution then continues with the return step 410.

In FIG. 15, there is shown a flow diagram 414 of the program for automatically adjusting the transmit frequency. Starting with initialization step 416, the temporary gain values for transmission at the higher (HighFreqGain) and lower (LowFreqGain) frequencies are initialized to their maximum possible value, the current gain setting (Gain) is saved (CurrentFreqGain) for later comparison and the offset frequencies are calculated (TrialHighFreq,TrialLowFreq).

Proceeding with step 418, if the TrialLowFreq is greater than 47000 Hz, execution continues with step 420 which takes an ultrasonic reading at the TrialLowFreq and continues with step 422 which saves (LowFreqGain) the gain associated with the lower frequency. If the TrialLowFreq is less than or equal to 47000 Hz, execution proceeds with step 424. At step 424, if the TrialHighFreq is less than 51000 Hz execution continues with step 426 which takes an ultrasonic reading at the TrialHighFreq and continues with step 428 which saves (HighFreqGain) the gain associated with the higher frequency. If the TrialHighFreq is greater than or equal to 51000 Hz, execution proceeds with step 430.

At step 430, the HighFreqGain is compared with the CurrentFreqGain. If it is less, flow continues with step 432 which assigns the current operating frequency (CurrentFreq) to the TrialHighFreq and proceeds to the return step of 438. If it is greater than or equal, flow continues with step 434.

At step 434, the LowFreqGain is compared with the CurrentFreqGain. If it is less, flow continues with step 436 which assigns the current operating frequency (CurrentFreq) to the TrialLowFreq and proceeds to the return step of 438. If it is greater than or equal flow continues with the return step of 438.

An example of a program selecting the appropriate bin under the control of the level sensing system 10 is provided in Table. The program is stored in ROM and read by the microprocessor 50, which is a Hitachi HD 64180 RO microprocessor sold by Hitachi America Limited Semi-Conductor, NIC Division, 2210 O-Toole Avenue, San Jose, Calif. 95131.

TABLE I

```
float PreviousDist = 0.0;

float SpeedOfSound;

struct UltEchoPulse {    unsigned int Counts;

/* The Count (time) to compare to

*/unsigned char Numrecords;

/* Tells how many records are in use in this struct

*/ unsigned long RunningTotal;

/* The total of the Tcounts entries

*/ unsigned long WidthTotal;
```

```c
/* The total of the Pwidth entries
*/    struct UltEchoPulse *NextLowerEchoPulse;

/* Pointers to NextHigher, NextLower EchoPulses
*/    struct UltEchoPulse *NextHigherEchoPulse;
      unsigned char JustRightLevels;

/* Keep track of the range
*/    unsigned char TooLowLevels;
      unsigned char TooHighLevels;
      unsigned long JustRightTotal;

/* Total readings dependant upon level
*/    unsigned long TooLowTotal;
      unsigned long TooHighTotal;

/***************************************************
*    Sensor.c   for 4110 flow logger
*
*    Author:      Steve Lenz
*                 1992, 1993
***************************************************/
float PreviousDist = 0.0;

float SpeedOfSound;

struct UltEchoPulse {   unsigned int Counts;

/* The Count (time) to compare to
*/unsigned char Numrecords;

/* Tells how many records are in use in this struct
*/ unsigned long RunningTotal;

/* The total of the Tcounts entries
*/ unsigned long WidthTotal;

/* The total of the Pwidth entries
```

```
*/    struct UltEchoPulse *NextLowerEchoPulse;
/* Pointers to NextHigher, NextLower EchoPulses
*/    struct UltEchoPulse *NextHigherEchoPulse;
      unsigned char JustRightLevels;
/* Keep track of the range
*/    unsigned char TooLowLevels;
      unsigned char TooHighLevels;
      unsigned long JustRightTotal;
/* Total readings dependant upon level
*/    unsigned long TooLowTotal;
      unsigned long TooHighTotal;
      unsigned int CntsFromLast;
/* The computed counts from the previously selected distance
*/    int Selectionfactor;
/* Weighting of how good this set is
*/
};
#define NUMEchoPulseDATA 20
int BestSelectionFactor;
struct UltEchoPulse EchoPulseData[NUMEchoPulseDATA];
/* The place to store our EchoPulses
*/ struct UltEchoPulse *EchoPulseDataHead;
struct UltEchoPulse *EchoPulseDataPtr;
/* Process our BINs, weighting each one, and return a distance that
```

```
*/
/* indicates the distance to the water
*/
/* The returned value is in (meters * 10000)
*/ signed long ProcessUlt()
{
    unsigned int
MostRight,MostReadings,WidestWidth,HighestCountDiff;
    struct UltEchoPulse
*MostRightPtr,*MostReadingsPtr,*WidestWidthPtr;
    struct UltEchoPulse *BestEchoPulse;

EchoPulseDataPtr = EchoPulseDataHead;

MostRight = 0;

MostReadings = 0;

WidestWidth = 0;

HighestCountDiff = 0;

CountsFromLast = PreviousDist / (SpeedOfSound *
FrequencyFactor / 2.0);
/* Walk through the BINS and gather the desired
information
*/ while (EchoPulseDataPtr) {
        if (EchoPulseDataPtr->JustRightLevels > 3) {
            if ((EchoPulseDataPtr->JustRightLevels +
(EchoPulseDataPtr->TooLowLevels >> 1)) > MostRight) {
                MostRight =
```

```
EchoPulseDataPtr->JustRightLevels +
(EchoPulseDataPtr->TooLowLevels >> 1);
                MostRightPtr = EchoPulseDataPtr;
        }
        else if
(EchoPulseDataPtr->JustRightLevels > MostRight) {
                MostRight =
EchoPulseDataPtr->JustRightLevels;
                MostRightPtr = EchoPulseDataPtr;
        }
    }
    else if (EchoPulseDataPtr->JustRightLevels >
MostRight) {
        MostRight =
EchoPulseDataPtr->JustRightLevels;
        MostRightPtr = EchoPulseDataPtr;
    }
    if (EchoPulseDataPtr->Numrecords >
MostReadings) {
        MostReadings =
EchoPulseDataPtr->Numrecords;
        MostReadingsPtr = EchoPulseDataPtr;
    }
    if ((EchoPulseDataPtr->WidthTotal /
EchoPulseDataPtr->Numrecords) > WidestWidth) {
        WidestWidth =
```

```
EchoPulseDataPtr->WidthTotal /
EchoPulseDataPtr->Numrecords;
            WidestWidthPtr = EchoPulseDataPtr;
        }
        if (EchoPulseDataPtr->Counts <
CountsFromLast) {      EchoPulseDataPtr->CntsFromLast
= CountsFromLast - EchoPulseDataPtr->Counts; }
        else {     EchoPulseDataPtr->CntsFromLast =
EchoPulseDataPtr->Counts - CountsFromLast;    }
        if (EchoPulseDataPtr->CntsFromLast >
HighestCountDiff) {      HighestCountDiff =
EchoPulseDataPtr->CntsFromLast;            }
        EchoPulseDataPtr =
EchoPulseDataPtr->NextHigherEchoPulse;    }
    EchoPulseDataPtr = EchoPulseDataHead;
    BestSelectionFactor = 0;
/* Now, walk through the BINS and assign the
Selectionfactor weighting
*/   while (EchoPulseDataPtr) {
        EchoPulseDataPtr->Selectionfactor = 0;
        if (EchoPulseDataPtr->CntsFromLast) {
            EchoPulseDataPtr->Selectionfactor +=
(100.0 - ((100.0 * EchoPulseDataPtr->CntsFromLast) /
HighestCountDiff)) * 0.30;     }    else {
    EchoPulseDataPtr->Selectionfactor += 30;       }
```

```
        if (EchoPulseDataPtr == EchoPulseDataHead) {
        EchoPulseDataPtr->Selectionfactor += 20;        }
        EchoPulseDataPtr->Selectionfactor +=
(EchoPulseDataPtr->Numrecords * 30) / MostReadings;

if (MostRight) {
/* Prevent Divide by zero
*/      unsigned int JR;
        if (EchoPulseDataPtr->JustRightLevels > 3) {
        JR =
EchoPulseDataPtr->JustRightLevels +
(EchoPulseDataPtr->TooLowLevels >> 1);
        }           else {
        JR =
EchoPulseDataPtr->JustRightLevels;
        }EchoPulseDataPtr->Selectionfactor += (JR * 60) /
MostRight;        }
        EchoPulseDataPtr->Selectionfactor +=
((EchoPulseDataPtr->WidthTotal /
EchoPulseDataPtr->Numrecords) * 20) / WidestWidth;
/* Divide the selectionfactor in half is this is */
/* a multiple of another distance                */
        if (A_Multiple(EchoPulseDataPtr)) {
EchoPulseDataPtr->Selectionfactor /= 2; }
/* Compare it the our Best so far... note that if two
have the */
```

```c
/* same selection factor weighting, we take the first
one */
        if (EchoPulseDataPtr->Selectionfactor >
BestSelectionFactor) {
            BestSelectionFactor =
EchoPulseDataPtr->Selectionfactor;
BestEchoPulse = EchoPulseDataPtr;             }
        EchoPulseDataPtr =
EchoPulseDataPtr->NextHigherEchoPulse;    }
    if (BestEchoPulse) {
        float Dist;
        if (BestEchoPulse->JustRightLevels) {
        if (BestEchoPulse->JustRightLevels < 3) {
            Dist =
(float)(BestEchoPulse->JustRightTotal +
BestEchoPulse->TooLowTotal) /
(float)(BestEchoPulse->JustRightLevels +
BestEchoPulse->TooLowLevels);          }
            else {
                Dist =
(float)BestEchoPulse->JustRightTotal /
(float)BestEchoPulse->JustRightLevels;         }
        } else {
            Dist =
(float)BestEchoPulse->RunningTotal /
```

```
(float)BestEchoPulse->Numrecords;          }

/* Dist now contains the averaged number of counts at the operating freq */

/* multiply by the speed of sound *

1/(operating freq) / 2.0 */

/* The divide by 2.0 is due to the round-trip of the wave */

Dist = Dist * SpeedOfSound * FrequencyFactor / 2.0;

PreviousDist = Dist;

/* If error, return 0 ! */ if (BestEchoPulse->Selectionfactor < 10) Dist = 0;

return((signed long)(Dist * 3048));

}

/* If error, return 0 ! */ return((signed long)(PreviousDist * 3048));
```

In use, the transducer 14 (FIG. 1) is mounted above the body of water to be monitored. It is connected to the processor in the cabinet 12 (FIG. 1) and the water depth is entered into the memory of the processor. The minimum distance to the water is entered into the processor to establish a blanking time after each transmission during which echoes are not be taken into account.

Transmission of ultrasonic pulses is initiated and the reflections are sensed. The time of sensing the leading edge and trailing edge from the time of transmission are entered into memory and the amplitude of the envelope is entered into memory. This data is used to sort ultrasonic pulses following a series of different transmissions and the most significant set or group of reflections is determined.

The sorting processes includes establishing time bins representing periods of time after each reflected pulse is received. The time bins are given a weight or priority to determine which is to be used to calculate the distance from the speed of sound and the time for the pulse to reach the surface and for the reflection to return to the receiver.

In assigning a priority for the most significant time bin, several different considerations are used, which are: (1) the closeness or shortness of the distance indicated by one bin from the last distance calculated; (2) whether the bin includes the first echo received from the series of echoes; (3) the number of echoes in a bin divided by the largest number of echoes of any of the bins; (4) the number of echoes within a preset amplitude range in a bin divided by the most number of level echoes within the amplitude range in all of the bins; and (5) the average width of the echoes in the bin divided by the largest average width of all of the bins. A blanking time period is set from the transmission and any reflections received before this blanking end of the time period are ignored.

The weight given to the considerations such as the considerations 1-5 above is determined empirically and generally as to the five considerations above is: (1) a weight of between 10 and 50 and preferably 30 multiplied by the the difference between the last measured distance and the distance represented by the bin divided by the last measured distance; (2) a weight of between 5 and 40 and preferably 20; (3) a weight of 10 and 50 and preferably 30 multiplied by the number of echoes in a bin divided by the largest number of echoes in all the bins; (4) a weight of between 20 and 100 and preferably 60 multiplied by the number of echoes of a sufficient height in a bin divided by the largest number of echoes of the predetermined correct level in all of the bins; and (5) a weight of between 5 and 40 and preferably 20 multiplied by the average width of the echoes in a bin divided by the average width of all of the bins. The sum of these factors may be used to pick the most significant group.

In the preferred embodiment, the transducer is mounted above the flow stream such as for example a channel for wastewater. The user normally has an approximate idea of the distance that will be measured. Accordingly, the user can select a minimum distance such as to the point of overflowing of the channel and provide a period of time blanking manually for the particular application so as to not measure echoes which may be only from the sides of the channel and the like and not be relevant.

The system itself hunts for a frequency that provides the highest amplitude echoes within a selected range of frequencies. The two stages of gain are set automatically by the program to seek peaks within the two thresholds. If repeated echoes are below the low threshold or above the high threshold, then the gain is automatically adjusted so the majority of the peaks will fall within the thresholds.

To obtain the data for selecting the most significant bin, the leading edge and the width of each reflection in a bin is dated by the microprocessor and the amplitude recorded. This data is then weighted to select the most significant bin as described above.

From the above description, it can be understood that the level measuring apparatus and technique of this invention has several advantages, such as for example: (1) it is less affected by noise; (2) it has a faster response time to raising and lowering of the level of liquids; and (3) it is relatively precise.

Although a preferred embodiment of the invention is described with some particularity, many modifications and variations in the preferred embodiment are possible within the light of the above disclosure. Accordingly, it is to be understood that, within the scope of the appended claims, the invention may be practiced other than as specifically described.

What is claimed is:

1. A method of determining a distance to a target comprising the steps of:
    transmitting pulses of a predetermined frequency of ultrasound;
    receiving a plurality of echoes from each of the pulses during a predetermined time period.
    recording the time between the reception of certain of said echoes which are and the time of the transmission of each pulse;
    establishing a plurality of time bins, each of which represents a different one of a plurality of time periods having the same duration, said duration being no longer than one-tenth of the entire time required to receive said echoes;
    counting the number of times the echoes received fall within each of certain of said time bins;
    determining which of the time bins has the largest number of echoes within it; determining which of the time bins is the most significant; and
    determining the distance based on the most significant time bin.

2. A method in accordance with claim 1 in which the most significant time bin is chosen in part by the time bin receiving the largest number of echoes.

3. A method in accordance with claim 1 in which a weight is given to the time bins based on at least one of the shortness of: the distance represented by the time bins from the last calculated distance to the target, the first echo received, the number of echoes in the bin, whether the bin receiving the most echoes is the same one that is picked as the most significant one, and the time width of the echoes; wherein the sum of the weights is used to determine the most significant bin.

4. A method in accordance with claim 3 in which the weight to be given is determined by multiplying a value in the range of between 10 and 50 times the difference between the last measured distance and the distance represented by the bin divided by the last measured distance, a factor between 5 and 30 for the bin containing the echo that is received first, a factor between 10 and 50 multiplied by the number of echoes in the bin divided by the largest number of echoes of all the bins, a value of between 20 and 100 multiplied by the number of echoes in the bin divided by the largest number of echoes in all of the bins and a value of between 5 and 40 multiplied by the average width of the echoes in one bin divided by the widest average of the width of echoes in all the bins.

5. A method in accordance with claim 1 in which the most significant bin is selected as one that takes into consideration the closeness of one bin to the previously selected time bin, the first bin of echoes received, the number of echoes in the bin divided by the largest number of echoes in any other bin, the number of echoes in a range of amplitudes of echoes divided by the largest number of echoes in any one of the bins falling within that amplitude range, and the average width of the echoes in a bin divided by the largest average width of the echoes in all of the bins.

6. Apparatus for determining distance comprising:
    means for transmitting pulses of a predetermined frequency of ultrasound;
    means for receiving a plurality of echoes from each of the pulses during a predetermined time period;
    means for recording the time between the reception of certain of said echoes and the transmission of the pulse;
    means for establishing a plurality of time bins, each of which represents a different one of a plurality of time periods having the same duration, said duration being no longer than one-tenth of the entire time required to receive said echoes;
    means for counting the number of times the echoes received fall within each of certain of said time bins;
    means for determining which of the bins has the largest number of echoes within it; means for determining which of the time bins is the most significant; and
    means for determining the distance based on the most significant time bin.

7. Apparatus in accordance with claim 6 in which the most significant time bin is chosen in part by the time bin receiving the largest number of echoes.

8. Apparatus in accordance with claim 6 in which weight is given to the time bins based on at least one of: the shortness of time the distance represented by the time bins from the last calculated distance to the target, the first echo received, the number of echoes in the bin, whether the bin receiving the most echoes is the same one that is picked as the most significant one, and the time width of the echoes; wherein the sum of the weights is used to determine the most significant bin.

9. Apparatus in accordance with claim 8 in which the means for determining the weight to be given includes means for multiplying a value in the range of between 10 and 50 times the difference between the last measured distance and the distance represented by the bin divided by the last measured distance, means for multiplying a factor between 5 and 30 for the bin containing the echo that is first, means for multiplying a factor between 10 and 50 by the number of echoes in the bin divided by the largest number of echoes in all the bins, means for multiplying a value of between 20 and 100 by the number of correct level echoes in the bin divided by the largest number of correct level echoes in all of the bins and means for multiplying a value of between 5 and 40 by the average width of the echoes in one bin divided by the widest average of the width of the echoes in all the bins.

10. Apparatus in accordance with claim 6 in which the most significant bin is selected as one that takes into consideration the closeness of one bin to the previously selected bin, the first bin of echoes received, the number of echoes in the bin divided by the largest number of echoes in any other bin, the number of echoes in a range of amplitudes of echoes divided by the largest number of echoes in any one of the bins falling within that amplitude range, and the average width of the echoes in a bin divided by the largest average width of the echoes in all of the bins.

* * * * *